April 16, 1957

N. J. ZAM 2,789,274

BATTERY CONNECTORS

Filed Sept. 22, 1954

INVENTOR.
NICHOLAS J. ZAM.
BY
ATTORNEY.

United States Patent Office 2,789,274
Patented Apr. 16, 1957

2,789,274
BATTERY CONNECTORS
Nicholas J. Zam, Toledo, Ohio

Application September 22, 1954, Serial No. 457,761

1 Claim. (Cl. 339—116)

This invention relates to electric battery terminal connectors.

This application is a continuation in part of my application for United States Letters Patent, Ser. No. 434,444, filed June 4, 1954, for Battery Terminal.

An object of this invention is to provide a battery terminal clamp adapted to receive cable fittings in the assembly of electric systems.

Another object of this invention is to provide a battery terminal clamp fully insulated against corrosion.

Another object of this invention is to provide a battery clamp insulated against corrosion in which the insulation extends beyond the clamp to sheath the joints formed by cable fittings attached thereto, and additionally shield the fitting.

And another object of this invention is to provide a battery terminal assembly, including a terminal clamp and a family of fittings readily attachable thereto to construct a predetermined electric circuit.

Other objects and advantages of this invention relating to the arrangement, operation and functions of the related elements of the structure, to various details of construction, to combination of parts and to economies of manufacture, will be apparent to those skilled in the art upon consideration of the following description and appended claim, reference being had to the accompanying drawings forming a part of this specification wherein like reference characters designate corresponding parts in the several views.

Referring to the drawings.

In the formation of an electric circuit, a single storage battery 10 may be employed, as in a motor vehicle, or a bank of such batteries may be indicated, as in an emergency power source. The clamp and cable, together with their fittings as herein shown, may be assembled to provide a circuit from a single or multiple battery source. To this end, a metallic body 12 may be provided with an aperture 14 adapted to embrace a terminal 16 of a battery 10.

Figure 1:
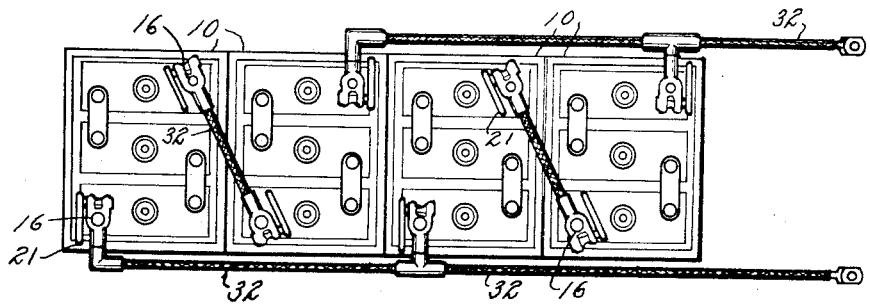
Fig. 1 is a plan view of a series of electric storage batteries interconnected to provide a source of power therefrom.
Figure 2:
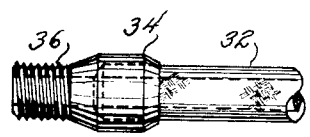
Fig. 2 is a side elevation of one type of cable fitting incorporated in the invention herein.
Figure 3:
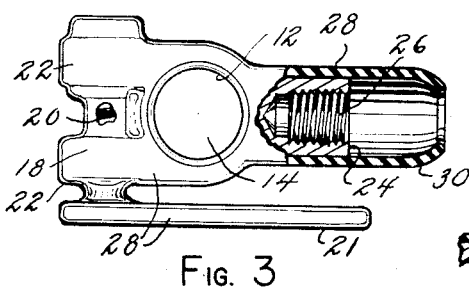
Fig. 3 is a plan view of a battery terminal clamp embodying a form of the invention herein.
Figure 4:
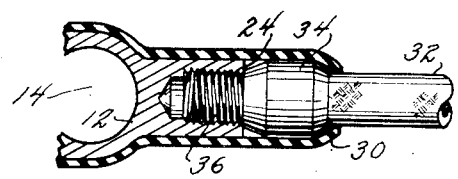
Fig. 4 is a fragmentary view of a clamp of the type illustrated in Fig. 3 showing an electric cable attached thereto.
Figure 5:
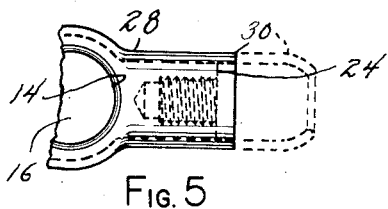
Fig. 5 is a view similar to Fig. 4 illustrating a modified form of the clamp.
Figure 6:
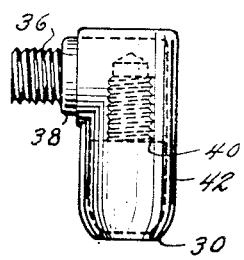
Fig. 6 is a plan view of an L-fitting adapted to be removably attached to a clamp of the type showing in Fig. 5.
Figure 7:
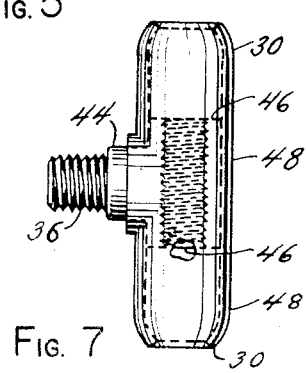
Fig. 7 is a plan view of a T-fitting adapted to be removably attached to the clamp of Fig. 5.

When the clamp body 12 is placed upon a terminal 16, a clamping mechanism 18 is operated by means of a crank or lever controlled screw mechanism to clamp this body in electrical contact with the terminal 16. This clamping mechanism 18 comprises a screw 20 threaded through arms 22 extending outwardly from the body 12. This screw 20 is rotated by crank 21 and draws the arms 22 together to firmly lock the clamp 12 onto the terminal 16. Outwardly extending from the body 12 is an integral boss 24 having an interiorly threaded bore 26 therein. The clamping body 12 and the clamp mechanism 18, together with the crank 21, is coated with an adherent insulation layer 28. This coating is preferably a synthetic rubber, like a plastic, a typical example of this being known in the trade as "Butanol." This coating serves to prevent any corrosion developing at or about this connection with a battery. The coating 28 also not only covers all the exposed parts of the clamp, but encases the exterior of the boss 24 and continues to provide a cuff 30 extending outwardly beyond the boss. This cuff is of considerable length, of which the entire length may be utilized, as hereinafter more fully explained, or such may be trimmed (Fig. 5) to meet a predetermined use. The clamp 12 is connected to an insulated cable 32, which cable is provided with a terminal fitting 34 having an exteriorly threaded portion 36.

This portion 36 may be thrust through the collar 30 to be threaded into the threading 26 in the boss 24, and as the connection therebetween is fully established, the cuff will shroud the joint developed between the boss and fitting, and also encase a portion or all of the fitting 34. If a straightaway line is desired, a fitting 34, in coaxial extent with the cable, 32, may be used to serve such purpose.

However, if it is desirable to carry the line angularly away from the clamp 12, an L-shaped fitting 38 may be employed having threaded extension 36, and an angularly extending portion 40 therefrom. In such an event, it may be desirable to provide the fitting 38 with an independent coating 42, which leaves but a portion of the fitting 38 to be enshrouded by the sleeve 30, and a straightaway cable may then in turn be threaded into the fitting 38 through the cuff 30 of insulation 42. If it is desired to provide a pair of cables extending from a single battery terminal, a T-fitting 44 may be employed having oppositely extending arms 46. It is also provided with a threaded extension 36 adapted to be assembled with the boss 24. This T-shaped fitting may have an insulation coating 48 from the arms 46 and extending therebeyond to provide cuffs 30, and a cable may be assembled with either or both arms. The insulations 28, 42, 48 are adherent coatings to the metallic bodies of the clamp, and the cuffs 30 serve to shroud the joints made in any assembly.

If it is desired to reassemble a circuit the cables 32 are easily removable, in that the threaded connections are fully insulated against corrosion and subsequent freezing, and a clean joint therebetween is maintained. The clamp 12 itself is easily removable from the battery terminals merely by an approximate 180 turn of the crank 21. With this small family of fittings, a wide variety of neat circuits may be established to provide power sources from one or a set of storage batteries.

All connections within the circuit are quickly and easily established and batteries may be exchanged with a minimum of time and the "butanol" colored in various hues to indicate positive or negative poles or other indicative data.

It is to be understood that the above description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention.

The language used in the specification relating to the operation and function of the elements of the invention is employed for purposes of description and not of limitation, and it is not intended to limit the scope of the following claim beyond the requirements of the prior art.

What is claimed and desired to secure by United States Letters Patent:

A battery connector comprising a body having an aperture therethrough to receive a battery terminal, a pair of arms extending from said body, screw means extending through said arms to provide a clamp for locking said body on said terminal, a crank fixed to one end of said screw for rotating the same, a boss extending from said body, an adherent insulating coating encasing the exposed portion of said body, arms, screw and crank, said coating comprising a rubber-like corrosion-resisting insulation having an inherent resiliency sufficient to permit normal operation of said crank without rupture thereof, and a continuation of said coating from said boss providing a cuff extension therefrom, said cuff tapering into a reduced diameter terminal collar.

References Cited in the file of this patent

UNITED STATES PATENTS

| | | | |
|---|---|---|---|
| 743,346 | Swain | Nov. 3, | 1903 |
| 1,096,699 | Elkin | May 12, | 1914 |
| 2,087,384 | Lee | July 20, | 1937 |
| 2,119,294 | Schefer | May 31, | 1938 |
| 2,216,344 | Hampton | Oct. 1, | 1940 |
| 2,299,291 | Zam | Oct. 20, | 1942 |
| 2,324,082 | Helm | July 13, | 1943 |
| 2,459,004 | Rogoff | Jan. 11, | 1949 |